May 3, 1932. J. SYLVESTER 1,856,669
ELECTRIC CONTROL SYSTEM FOR CONVEYERS
Original Filed Jan. 21, 1929    12 Sheets-Sheet 1
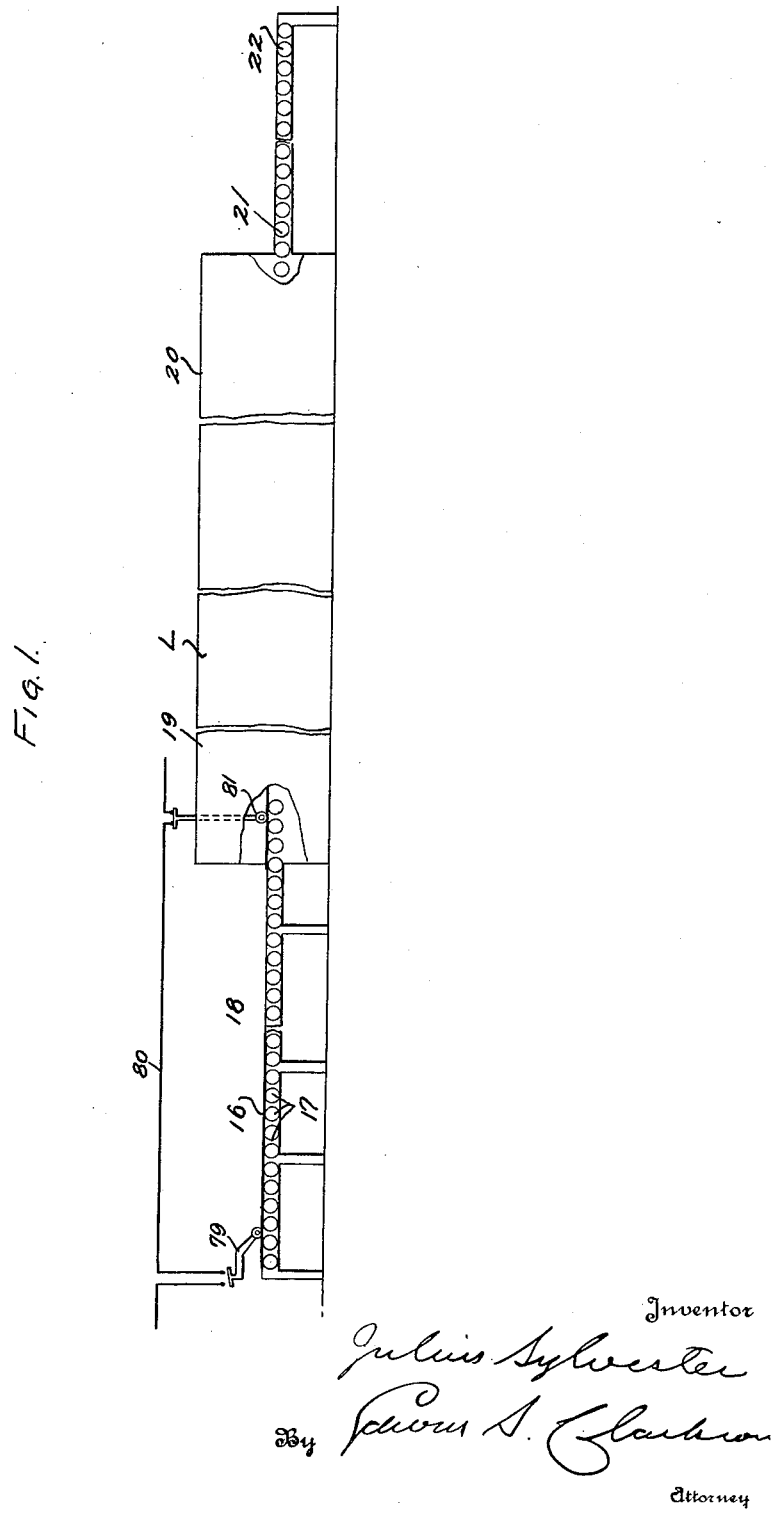

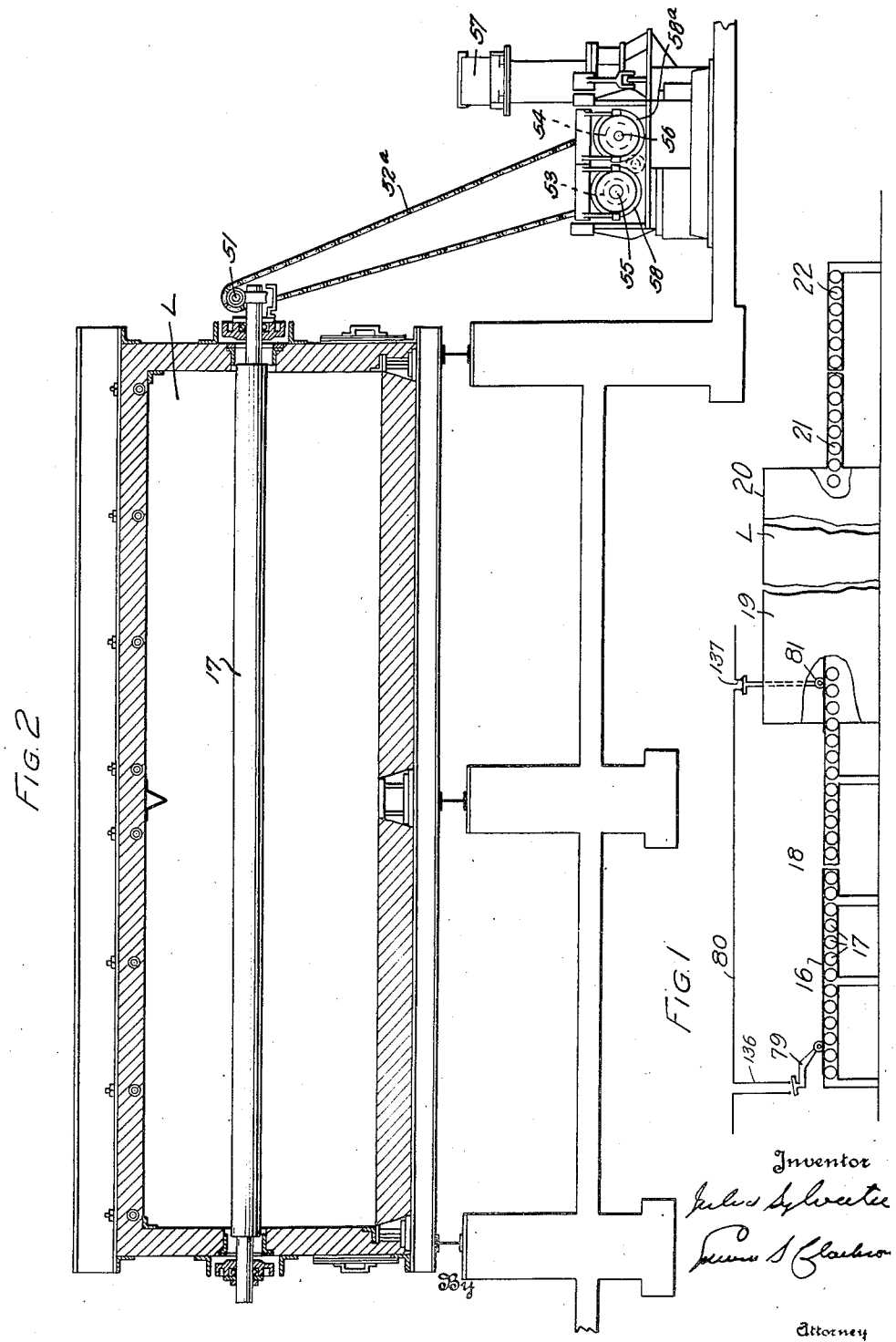

May 3, 1932. J. SYLVESTER 1,856,669
ELECTRIC CONTROL SYSTEM FOR CONVEYERS
Original Filed Jan. 21, 1929 12 Sheets-Sheet 3
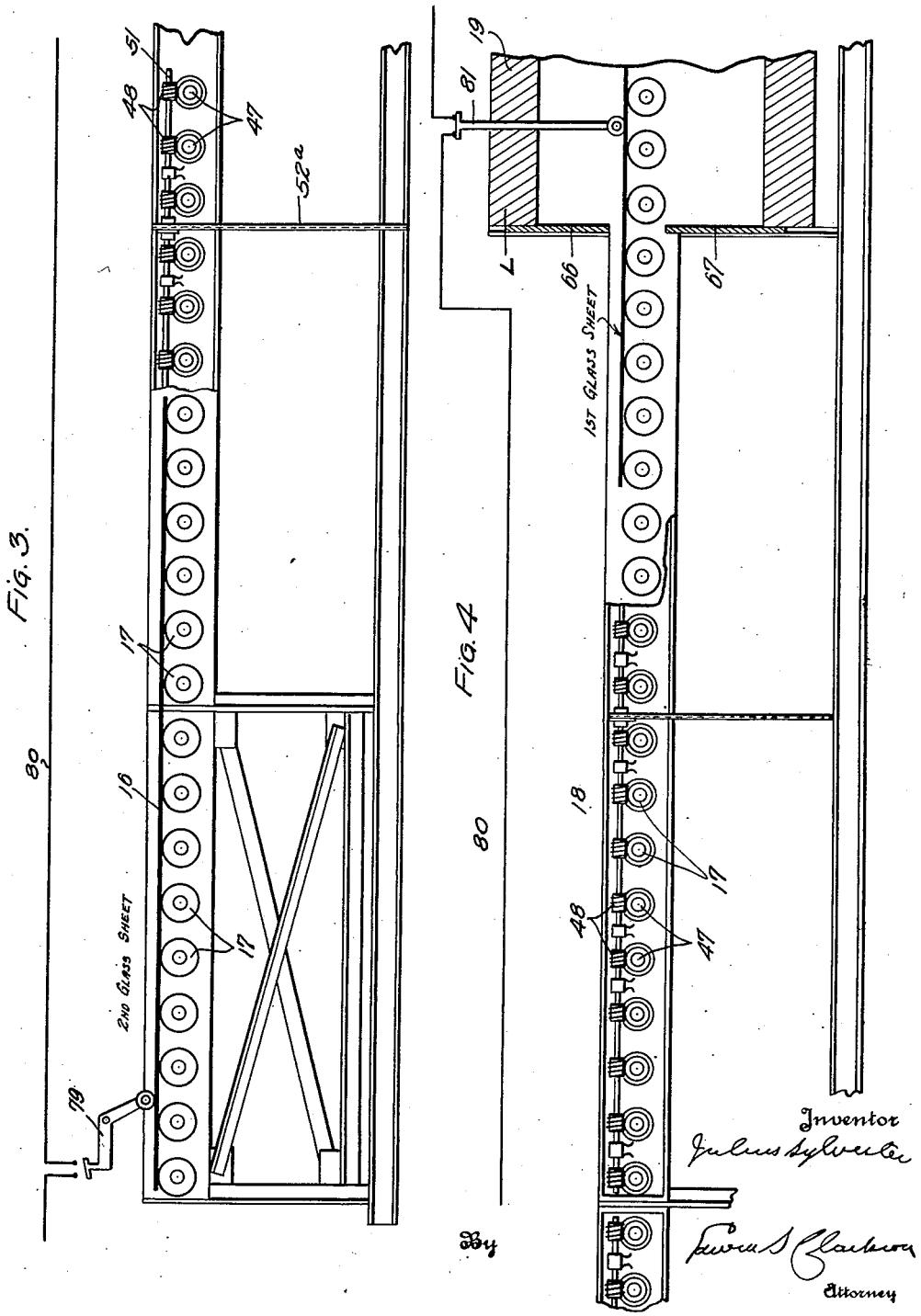

May 3, 1932.  J. SYLVESTER  1,856,669
ELECTRIC CONTROL SYSTEM FOR CONVEYERS
Original Filed Jan. 21, 1929   12 Sheets-Sheet 4
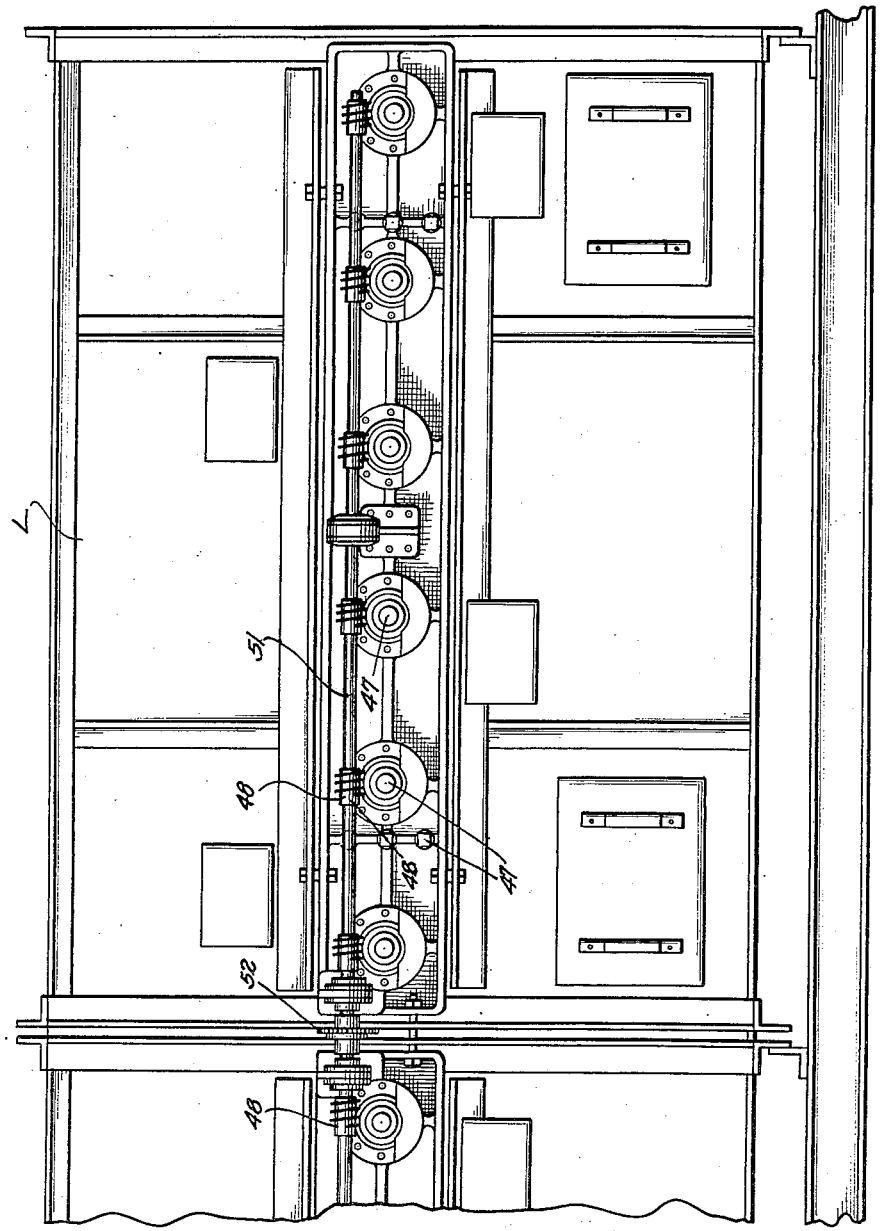

May 3, 1932.  J. SYLVESTER  1,856,669
ELECTRIC CONTROL SYSTEM FOR CONVEYERS
Original Filed Jan. 21, 1929   12 Sheets-Sheet 5
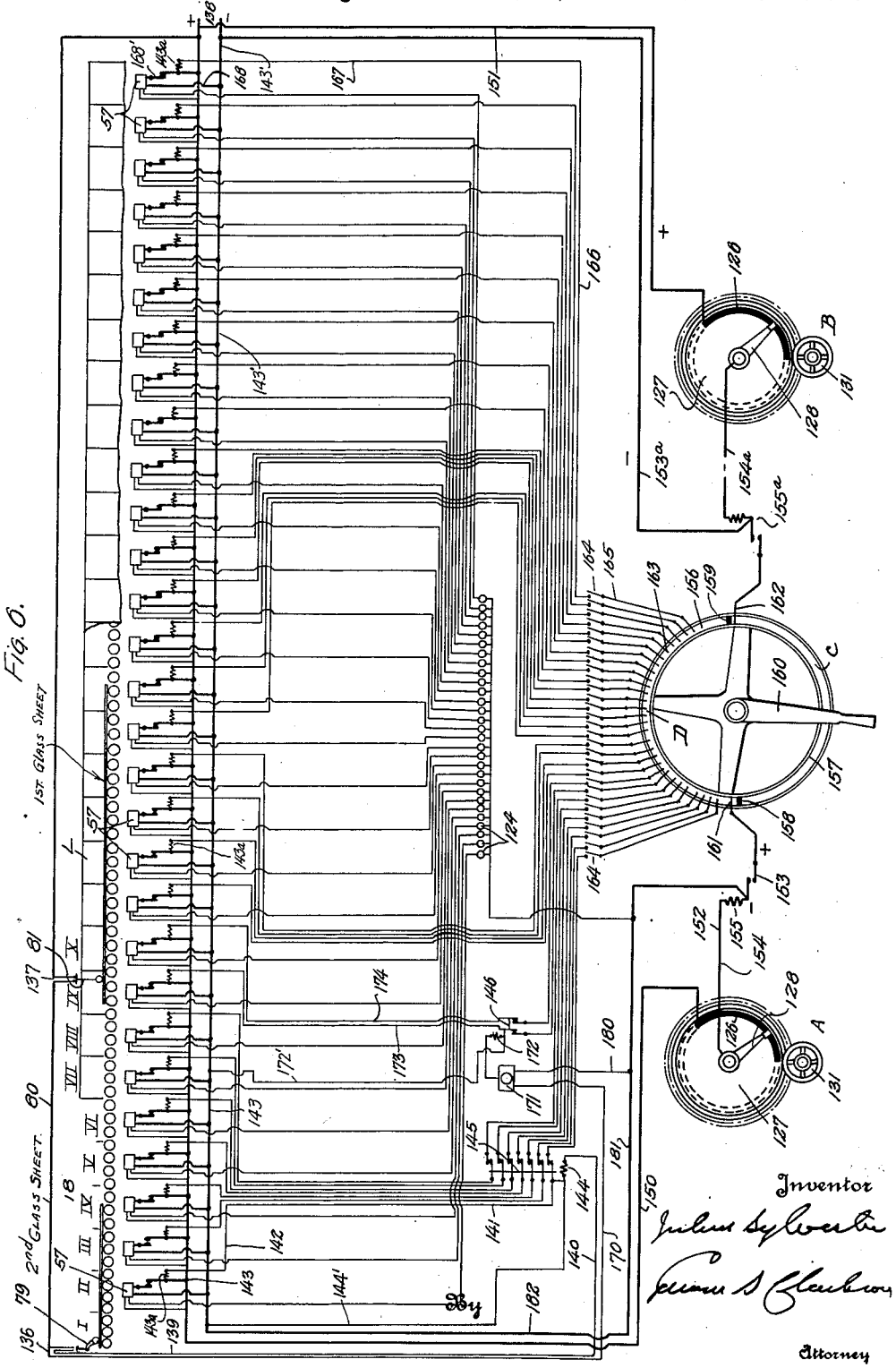

May 3, 1932. J. SYLVESTER 1,856,669
ELECTRIC CONTROL SYSTEM FOR CONVEYERS
Original Filed Jan. 21, 1929 12 Sheets-Sheet 7
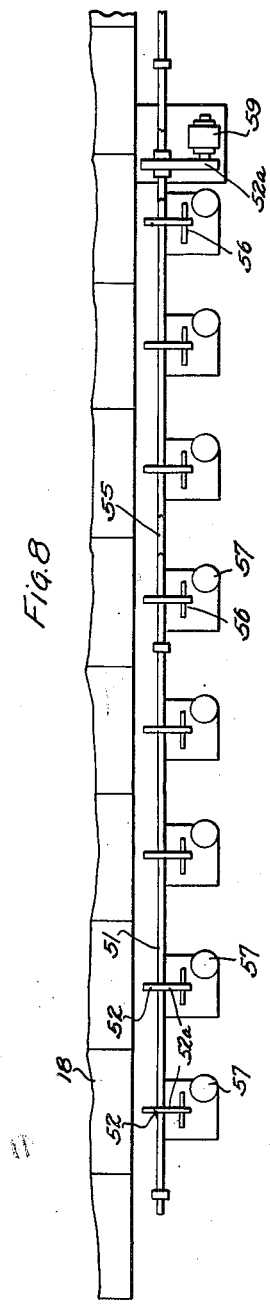
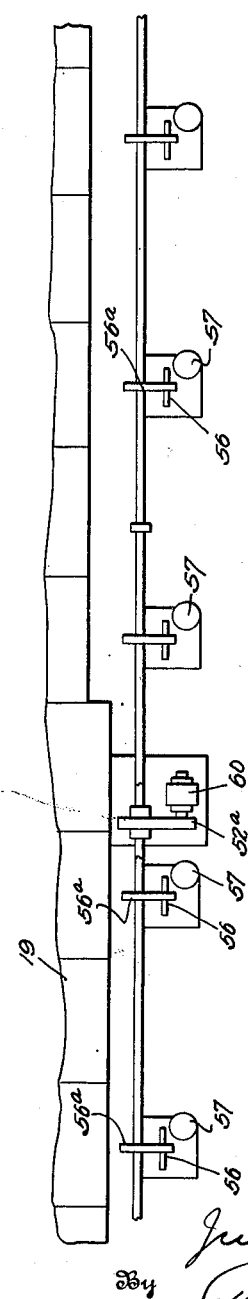
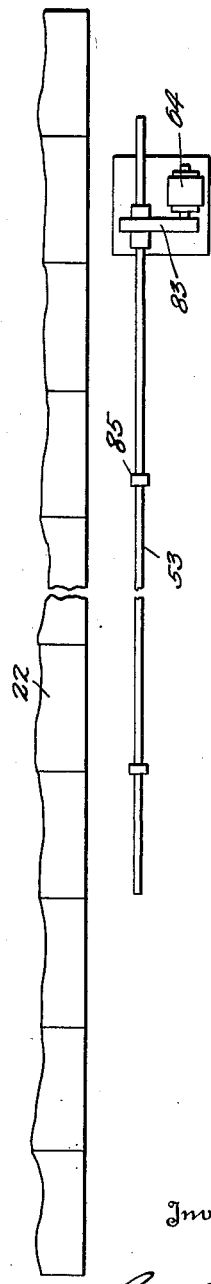

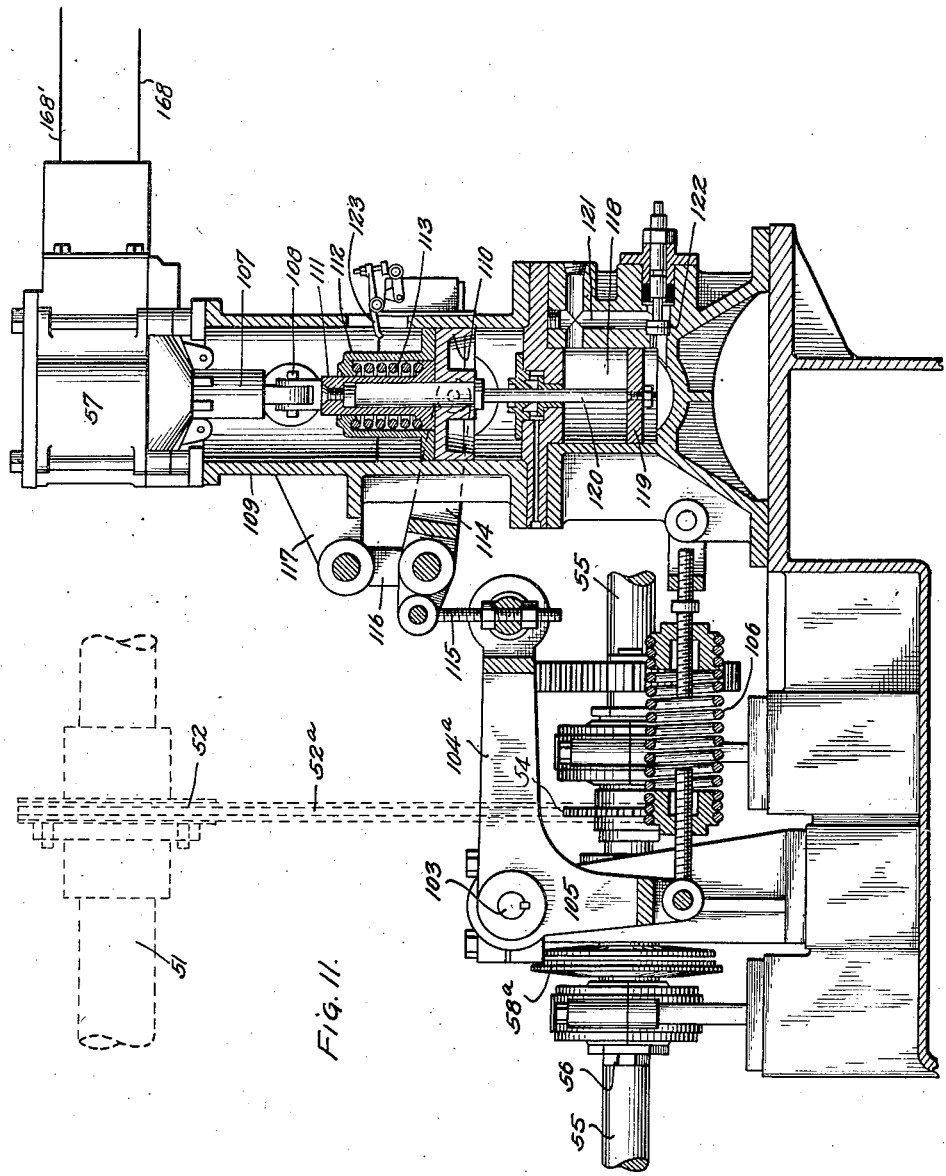

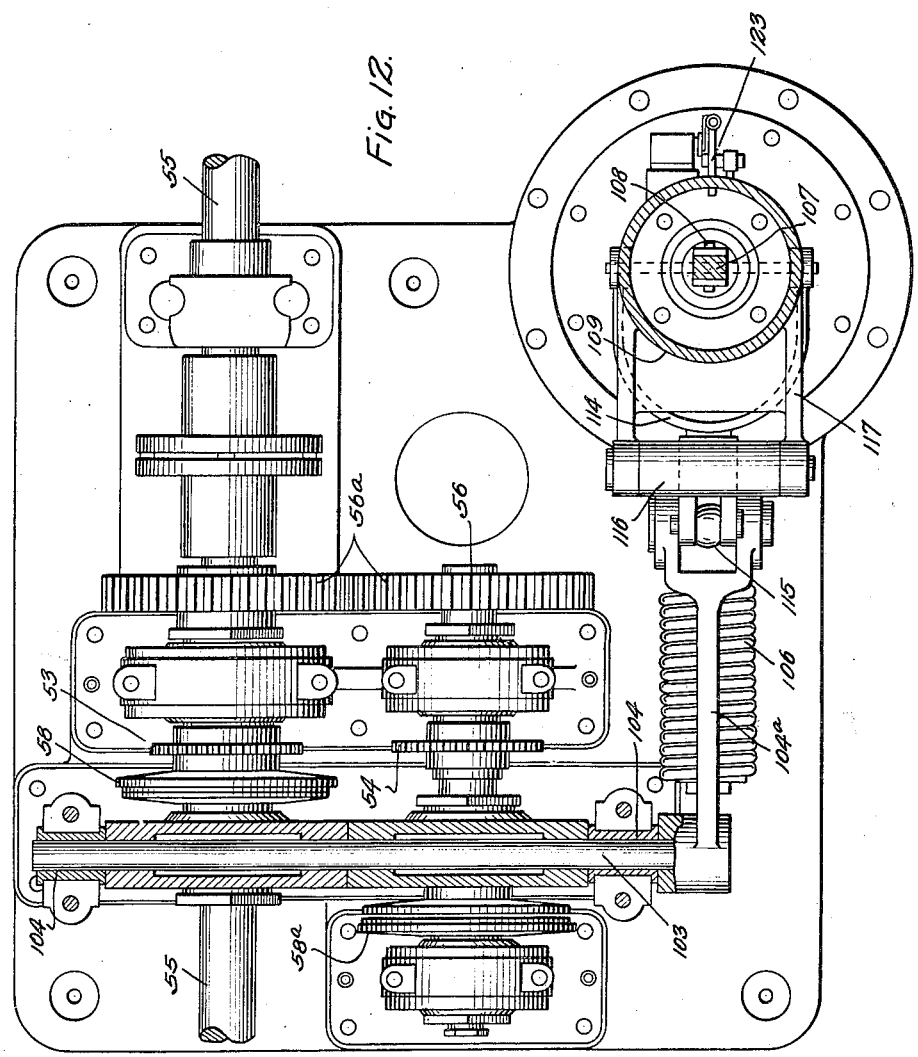

May 3, 1932.  J. SYLVESTER  1,856,669

ELECTRIC CONTROL SYSTEM FOR CONVEYERS

Original Filed Jan. 21, 1929  12 Sheets-Sheet 11

Inventor
Julius Sylvester
By James S. Clarkson
Attorney

May 3, 1932.　　　J. SYLVESTER　　　1,856,669
ELECTRIC CONTROL SYSTEM FOR CONVEYERS
Original Filed Jan. 21, 1929　　12 Sheets-Sheet 12

Patented May 3, 1932

1,856,669

UNITED STATES PATENT OFFICE

JULIUS SYLVESTER, OF WASHINGTON, PENNSYLVANIA, ASSIGNOR TO SIMPLEX ENGINEERING COMPANY, OF WASHINGTON, PENNSYLVANIA, A CORPORATION OF DELAWARE

ELECTRIC CONTROL SYSTEM FOR CONVEYERS

Original application filed January 21, 1929, Serial No. 333,887. Divided and this application filed January 4, 1930. Serial No. 418,576.

This invention relates to an electric control system for conveyers, and the present application is a division of my prior application filed January 21, 1929, Serial No. 333,887.

In my said application Serial No. 333,887 I have shown the electric control system of the present invention as applied for controlling the action of sets of conveyer rolls of a roller leer forming part of a sheet glass forming and annealing apparatus in which all the rolls rotate at a high speed, which may be equal to the rate of sheet formation, and in which, by means of the said electrical control system, a portion of the rolls normally rotate constantly forward while another portion of the rolls are caused to rotate periodically and successively forward and backward, so that the progress of the intermittently formed sheets of glass through the leer as a whole is substantially slower than the feed rate of the first-named rolls, or the rate of sheet formation. As disclosed in said application Serial No. 333,887, the leer rolls preferably comprise a primary set of rolls normally rotating constantly forward to convey the sheets on a preliminary traverse at a high rate of speed, a secondary set of reversing rolls driven at a rate of speed at least as great as that of the primary set but which are periodically reversed so that they will periodically impart a differential back and forth movement to the sheets on their final traverse such that the sheets progress at a less rate on such traverse than on their preliminary traverse, and an intermediate set of transfer rolls which are alternately rotated backward and forward and synchronized successively with the primary and reversing sets of rolls for the transfer of the sheets from the primary set to the reversing set of rolls without buckling of the sheets; the arrangement being such that the sheets are supported by conveyer rolls rotating throughout at a constant high speed to prevent deformation of the glass while governed in part with respect to direction of rotation to cause the sheets to take a course of travel of greater length and greater duration of time than required by a direct travel of the sheets through the leer at initial or sheet formation speed. The rolls may also by means of the electrical control system be governed to regulate their reversing periods, and the rolls may further be arbitrarily caused in whole or in part to rotate forward or backward at will to meet varying conditions of service.

The present invention applies to the broad use of a control system of the character described in conjunction with a roller or equivalent conveyer for general purposes in the transportation of goods or articles of various kinds through a treatment kiln, chamber or course, where the goods or articles during the treatment period should have a range of travel greater than the length of the kiln, chamber or course. The present invention, therefore, is not limited to the use of a control system in conjunction with a glass forming apparatus employing a roller leer in which the working action of the control system and rolls is dependent upon the intermittent action or sheet formation rate of a conjoined sheet forming device, or to the feed and treatment by the apparatus of sheet glass, or to the feed of the material constantly forward on the initial part of its travel at a fast rate of progression and thereafter at a lower rate of progression, as the control system and roller conveyer or its equivalent may be used for action on glass sheets formed by a sheet forming device separate from a conveyer mechanism or leer, or for action upon sheet materials of other kinds, or upon bars, billets or other articles to be variously treated, or for action upon glass, porcelain or other articles or ceramic goods generally either placed directly upon the conveyer or upon trays or other holders intermittently supplied for transport by the conveyer through the leer treatment kiln, chamber or course. The present invention is, furthermore, not limited to an apparatus in which a primary portion of the rolls constantly rotate in a forward direction and succeeding rolls are periodically and successively reversed to rotate alternately forward and backward, as, within the spirit and scope of the invention, the action of the rolls may be opposite of that described, or, in other words, the primary portion of the rolls may be those reversed for periodic forward and backward motion and the succeeding rolls have a constant forward motion, so that the articles may have a slow rate of progression on the preliminary part of their travel and a faster rate of progression on the final or following part of their travel.

The invention is shown in the accompanying drawings as employed in conjunction with a treatment kiln or chamber in the form of a glass annealing leer including a roller conveyer, but it is to be understood that the invention is not restricted to the particular structures shown for purposes of exemplification, but may be employed in conjunction with any of the various types of treatment kilns or chambers and conveyers for which it is adapted.

In the drawings:—

Fig. 1 is a diagrammatic side elevation of a kiln embodying a roller conveyer in connection with which my improved electrical control means is used.

Fig. 2 is a vertical transverse section through the kiln, showing the driving mechanism for one of the rolls.

Figs. 3 and 4 are diagrammatic views showing the progress of a sheet of glass through the first portion of the kiln.

Fig. 5 is a side elevation of one section of the kiln showing one of the roll operating shafts.

Fig. 6 is a wiring diagram of the electrical conveyer controlling means.

Figs. 8, 9 and 10 are diagrammatic representations of the roll driving apparatus.

Fig. 11 is a detail view partly in side elevation showing the clutch operating mechanism.

Fig. 12 is a view partly in section and partly in plan showing the clutch operating mechanism.

Figure 7:
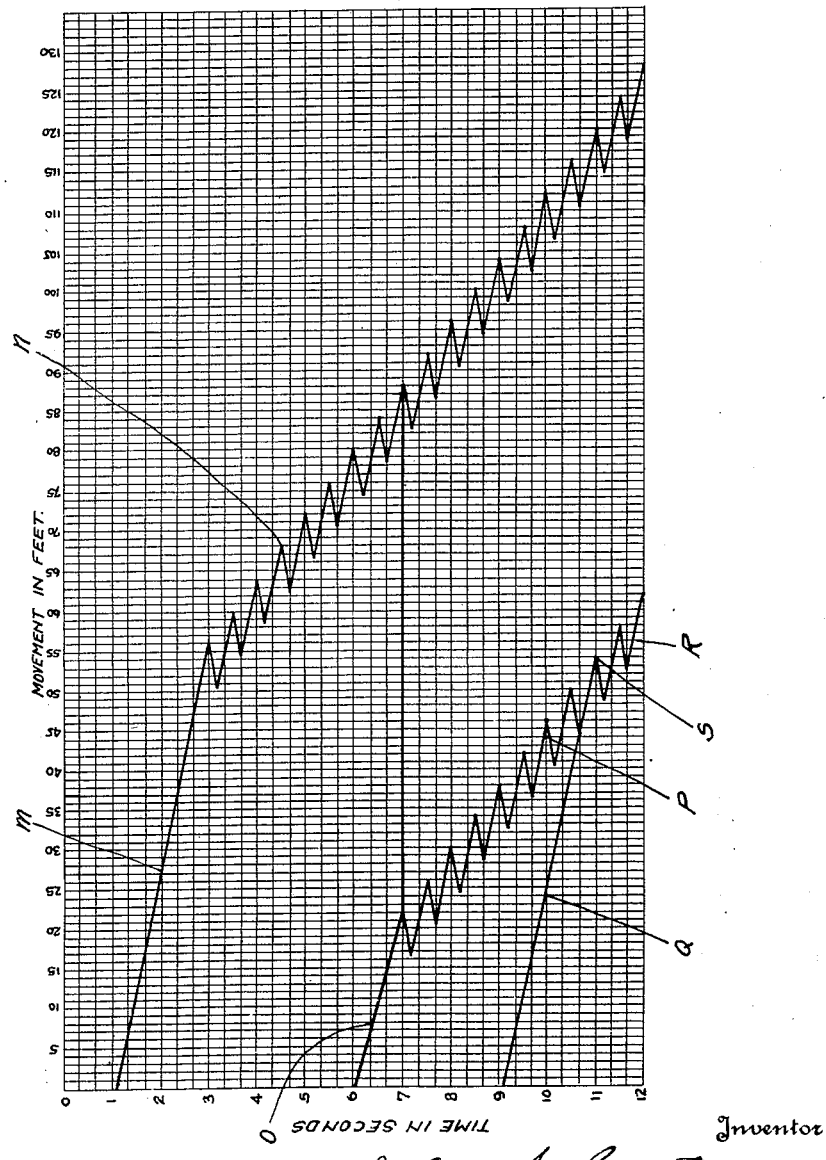
Fig. 7 is a graphic representation of the normal progress of a sheet of glass through the kiln.

While in the following description the invention is set forth more particularly with relation to a roller leer as the treatment apparatus and to sheets of glass as the material conveyed and treated, it is, of course, to be understood, as before stated, that the particular exemplification given is merely used for convenience, and that the invention is not in any manner restricted thereto.

The leer, kiln or treatment chamber, defining the treatment course, is indicated diagrammatically in Fig. 1, and comprises first an open portion 18 along which the sheet of glass 16 is advanced by means of rotating rollers 17 to the closed or chambered portion L of the leer. Suitable doors (not shown) may in practice be provided at this end of the leer, which may be opened to permit the sheets as they are fed up to pass into the leer, the doors then being closed to prevent loss of heat from the leer. The closed or chambered portion of the leer may be heated by suitable electrical or other heating means, and this portion of the leer may be made up of two principal divisions which may be referred to as the highly heated portion 19 and the less highly heated portion 20. The temperatures within the leer chamber may be regulated as desired, but preferably range from a maximum of about 1200° F. at a point near the entrance to the highly heated portion of the leer, to a temperature of about 150° F. at the end of the cooling portion of the leer, the temperatures more or less gradually decreasing between maximum and minimum, as indicated in the diagrammatic showing in Fig. 1.

The operation of the conveying rollers 17 in conveying the glass sheets through the leer will be described in greater detail hereinafter in reference to the control mechanism. Briefly set forth, however, the glass sheet passes first onto a series of rolls rotating in a forward direction only at a predetermined high speed, which may, as set forth in my application Serial No. 333,887, in the case of the use of a conjoined glass sheet casting apparatus, be at least as great as the speed of sheet formation, while the rolls in the principal portion of the leer are revolving successively forwardly and then rearwardly, but at a peripheral speed at least as great as that of the rolls which move forwardly only. These alternately reversing rolls normally rotate in a forward direction for a longer period than in the rearward direction, or, in other words, have differential forward and backward feed motions, in order that there may be a general advance of the sheet through the leer as a whole. In order for the sheet of glass to pass from the forwardly moving rolls to the reversing rolls it is necessary to provide an intermediate set of transfer rolls to prevent buckling or breaking of the sheets of glass. These transfer rolls take up first the movement of the first or forwardly moving rolls until the sheet of glass rests entirely upon the transfer rolls. The transfer rolls are then automatically synchronized with the reversing rolls in the remainder of the leer, until the first sheet has passed onto the reversing rolls and another sheet is ready to be transferred from the forwardly moving rolls to the reversing rolls. The transfer rolls are then automatically synchronized with the first or forwardly moving rolls (see diagram Fig. 6). This automatic synchronism is accomplished by contact of the glass sheets with switches 79 and 81 in a circuit 80, as shown in Figs. 3 and 4, and as will be more fully described hereinafter by reference to the control diagram in Fig. 6.

In passing from the closed portion L of the leer the glass is received upon idler rolls 21 beyond which are located a plurality of power-operated but manually controlled rolls 22. The length of the idler section is such that a sheet of glass will entirely bridge this section so that one end of the sheet may still rest upon the reversing rolls in the closed portion of the leer, when the other end has reached the manually controlled rolls 22.

The rolls 22 may be operated by a motor 64, Fig. 10, which drives the rolls through a chain 83, shaft 84 and worm gearing 85, the motor being started and stopped by means of a suitable hand switch (not shown). In this manner the glass sheets may be transferred from the leer to the rolls 22 and the rolls 22 then stopped by cutting off the motor 64.

Figure 13:
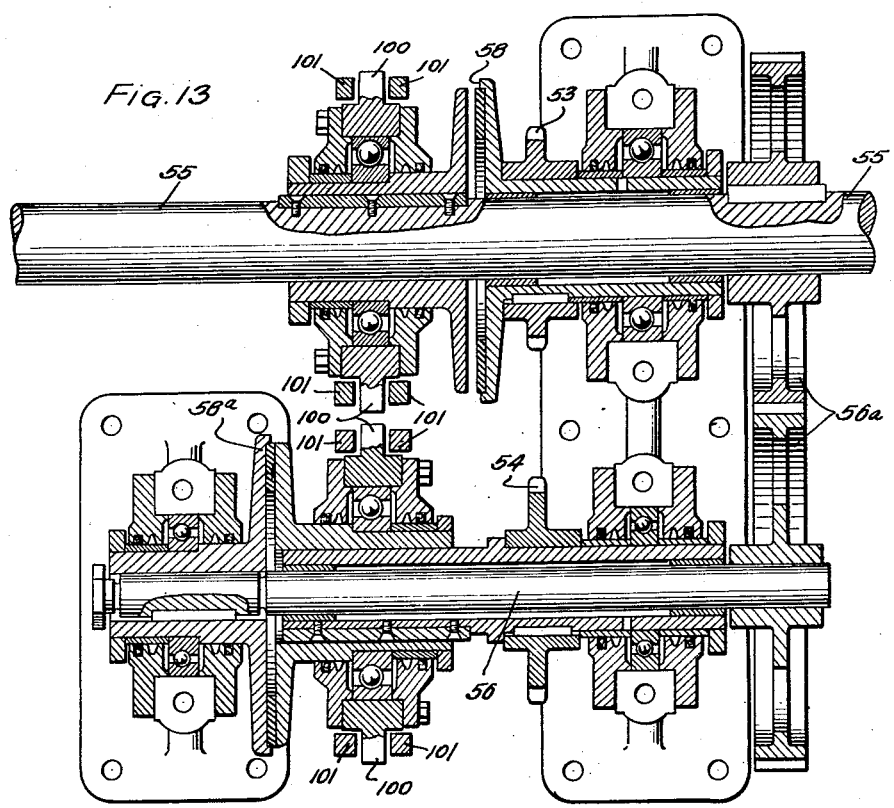
Fig. 13 is a horizontal sectional view of the clutch assembly on line 13—13 of Fig. 14.
Figure 14:
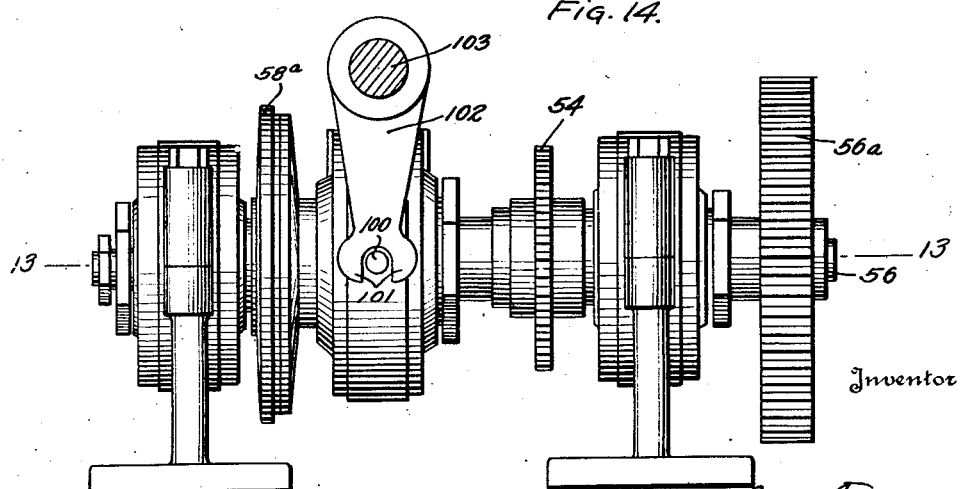
Fig. 14 is an end view of the clutch assembly.

The general arrangement of the roll driving mechanism is shown in Figs. 2, 5, 8, 9 and 10. The rolls of each section in the main portion of the leer are driven by shafts 51, Fig. 5, near the center of each of which is located a sprocket 52 which is turned by a chain 52ª passing over sprockets 53, 54, Fig. 2, carried by a main shaft 55 and a countershaft 56 respectively. The sprockets 53 and 54 are caused to rotate with either the main or countershafts by means of clutches 58, 58ª, shown in detail in Figs. 11, 12 and 13, which clutches are operated by solenoids 57. As shown in Fig. 8, the main shaft 55 extends the entire length of the leer, the countershafts 56 being geared thereto as at 56ª, and rotating in a direction reverse to the main shaft. The main shaft is driven from a plurality of motors 59 and 60 geared thereto, and having pin clutches interposed between the motors and the shaft, whereby any one of the motors may be removed for repairs without interfering with the operation of the leer (Fig. 8).

In Fig. 8 portions of the leer are represented diagrammatically. The main shaft extends the entire length of the leer proper beginning with the open section 18 and ending at the end of cooling section 20. This shaft is constantly rotating and all the rolls of the leer proper are operated from this shaft over one of the countershafts, at a constant peripheral speed equal to the speed of sheet formation. The direction of motion will be either forward or rearward depending on whether the rolls are operated directly from the main shaft or from the countershaft. The main shaft does not extend along section 21 as this section is occupied by the idler rolls and the rolls 22 at the discharge end are not actuated from the main shaft but from the shaft 53 by means of the motor 64, as previously described.

The clutches and clutch operating mechanism which serve to connect each roller shaft 51, which drives a section of rolls 17, alternately to the main shaft 55 and to the countershaft 56 to thereby rotate the rollers 17 of one section of the leer alternately in a forward and rearward direction are best shown in Figs. 11, 12, 13 and 14. It will be understood that one set of clutches and operating mechanism therefor is employed for each set or section of rolls except the first, and the description of one such mechanism is applicable to all.

As shown the main shaft 55 is constantly geared to the countershafts 56 and the sprockets 53 and 54 are loosely mounted upon these rotating shafts, but each may be caused to rotate with its respective shaft by means of the clutches 58 and 58ª. These clutches are provided with pins 100 which are engaged by fingers 101 of the crank arms 102 carried by a shaft 103 journaled at its ends in bearings 104. The shaft 103 is rotated by means of an arm 104ª of a bell crank, the other arm 105 of which is engaged by the spring 106 which tends to operate the clutch 58 upon the main shaft 55; so that when no power is applied to the arm 104ª of the bell crank the rolls of this section of the leer will be operated from the main shaft and in a forward direction.

The arm 104ª of the bell crank is operated by the solenoid 57 in such manner that when the arm 104ª is depressed the clutch 58ª causes the sprocket 54 to rotate with the counter shaft 56 and thus produce reverse rotation of the rolls of the section controlled by this solenoid.

As shown in Fig. 11 the connection between the core 107 of the solenoid and the clutch operating arm is as follows: The core 107 is connected by means of a universal joint 108 to a compound plunger reciprocable in a cylinder 109. The compound plunger is composed of an outer plunger 110 and an inner plunger 111, the latter being directly connected to the core of the solenoid, and slidable within a housing 112, of the outer plunger. A spring 113 reacts between the inner plunger and the housing 112. The outer plunger is connected through crank arms 114 passing through slots in the cylinder 109, to an adjustable link 115, which is carried by clutch operating arm 104ª. The forked member 114 is pivoted intermediate its ends and is suspended by means of a swinging link 116 to a fixed frame member 117.

Below the cylinder 109 is a dash pot or retarder 118 which is filled with oil or the like under pressure. A piston 119 works in the dash pot and is connected to plunger 110 by means of a piston rod 120. A by-pass connection 121 opens above and below the piston 119, which bypass may be cut off to any desired extent by means of a screw operated valve 122. In this manner the action of the piston 119 and of the plunger 110 may be retarded to any desired extent.

The purpose of the retarding action of the dash pot is to prevent jars due to sudden reverse of direction of rotation of the rolls, which might cause breakage of glass. By the use of the retarder the reversal is gradual and without shock.

As shown a finger 123 projects into the cylinder 109 and is engaged by the plunger 110 in either direction of its movement. The finger 123 controls a circuit in which is located a signal light which is designed to indicate to the operator of the leer whether a particular solenoid is in operation. A plurality of such signal lights are shown at 124 in the control diagram, Fig. 6.

The solenoid 57 is alternately energized and deenergized by means of a master control switch or timer 125, which timer may through a suitable arrangement of relays and main operating circuits control all of the solenoids of all the roll sections. As shown the timer comprises a dial upon the face of which is located a conductor portion 126 and an insulating portion 127, the two portions making up a complete circle. A rotary contactor or hand 128, which is preferably operated by suitable gearing from the main drive shaft of the leer, engages alternately the conducting portion 126 of the dial, and then the insulating portion 127. During the period of engagement with the conducting portion a circuit is closed through the solenoid, which draws the core 107 upward, and with it the inner plunger 111, which serves to compress spring 113. The spring 113 moves the plunger 110 upwardly, with a delayed action due to the dash pot 118. The upward movement of the plunger 110 depresses arm 104ª of the clutch operating mechanism against the resistance of spring 106 and causes the sprocket 54 to rotate with the counter shaft 56, thus producing reverse rotation of the rolls in the section controlled by the solenoid.

As soon as the contactor arm 128 reaches the insulating portion 127 of the control dial the circuit to the solenoid is broken and an action opposite to that just described takes place, and the section of rolls of the leer which had been rotating in a reverse direction are now rotated in a forward direction by the main shaft.

Figure 18:
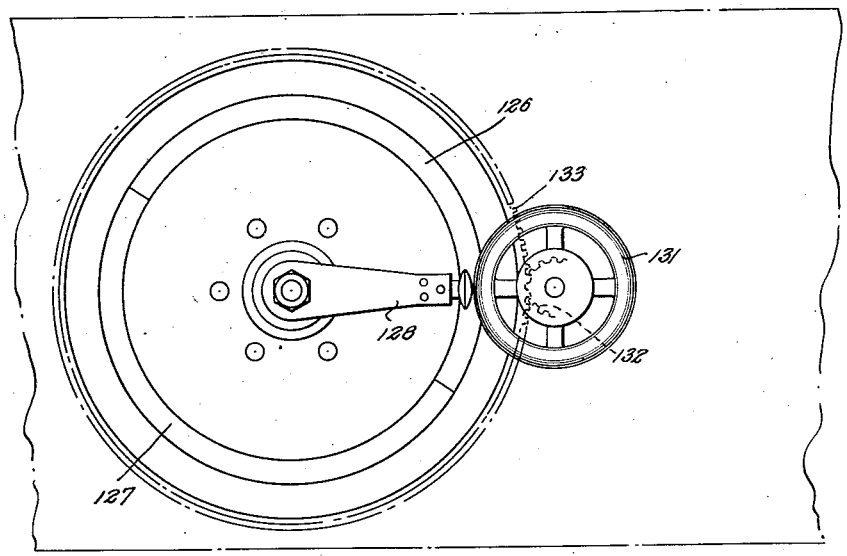
Figs. 18 and 19 are enlarged details showing one of the master controls.
Figure 19:
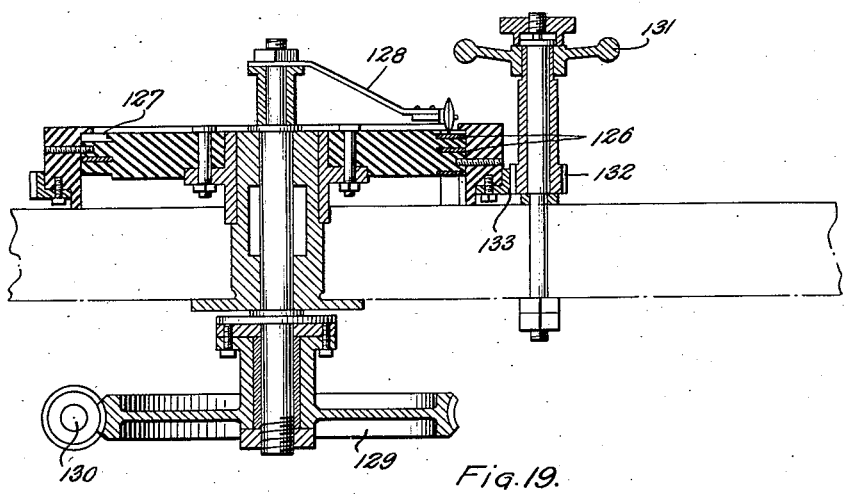

The timer switch is shown in further detail in Figs. 18 and 19. In Fig. 19 the numeral 129 denotes a gear wheel which is operated through worm 130 and suitable intermediate mechanism from the main drive shaft 55 of the leer for rotating the contactor arm 128.

By regulating the relative lengths of the conducting strip 126 and insulating strip 127 the relative periods of reverse and forward movement of the rolls can be varied at will. Thus, with balanced gear ratios, if the two strips were of equal lengths the rolls would rotate forwardly and rearwardly for equal periods of time, and there would be no progress for a sheet of glass on such rolls. In the normal operation of the leer the insulating portion of the dial is longer than the conducting portion; thereby the rolls rotate for a greater period forwardly than rearwardly, and there is a gradual advance of the glass sheet through the leer. It is also possible to cause a general reverse movement of the glass by having the conducting portion of the control switch longer than the insulating portion. It is also possible to cause all the rolls to rotate continuously forwardly or continuously rearwardly by having the arm 128 contact with insulating material only, or with conducting material only. A regulation of the relative effective lengths of the conducting and insulating strips may be accomplished by means of a hand wheel 131 which rotates a gear 132 in mesh with a toothed wheel 133, which serves to regulate the length of time of contact between the arm 128 and the insulating and conducting strips 127 and 126 respectively.

The toothed wheel 133 is connected to an insulating block 200 which latter is connected by means of screws to an insulating block 201. The block 201 has a helical groove 202 to receive the conducting strip 126 which is in the form of a helix, one end being fastened to a stationary part of the leer, for example, by the bolt 203 whilst the other end is free. By rotating the insulating block 200 by means of the gears 132, 133 the helical conducting strip can be wound into the interior of the insulating block and thereby expose the free end to the desired degree depending on the amount of rotation given to the gears.

Turning the gears in one direction will expose a greater amount of the helical conducting strip, while turning them in the opposite direction will expose a lesser amount of the strip.

Figure 15:
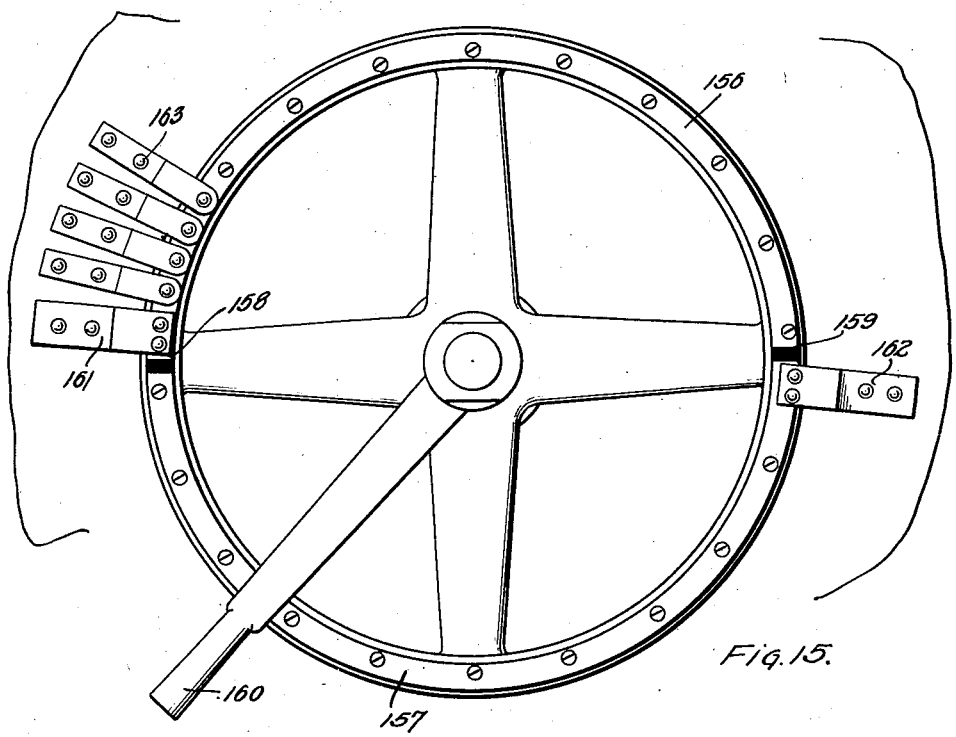
Figs. 15, 16 and 17 are detail views on an enlarged scale showing the emergency control device.
Figure 16:
Figure 17:
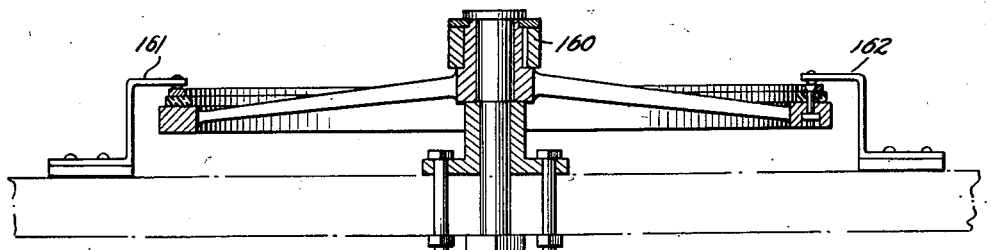

In Fig. 6 two master control switches or timers, A and B are shown, such as that designated by 125 and described in reference to Fig. 11. These switches are connected to a positive source of current by means of leads 150 and 151, while the contactors 128 are connected to a negative supply by means of leads 152 and 153. Leads 154 and 154ª are provided by means of which additional circuits are closed leading to emergency control switch C through relays 155 and 155ª. The details of the emergency control switch are shown in Figs. 15, 16 and 17. This emergency control consists of an annular member comprising two conducting halves 156, 157 separated by insulating blocks 158, 159. The annular member may be rotated by means of a handle 160 so as to bring the insulating blocks to any desired position. Contact may be made between master switches A and B and the emergency control C by means of fixed contactor fingers 161 and 162, which may be connected with either section 156 or 157 of the emergency control. In addition to the main contact fingers 161 and 162 there are a plurality of smaller contact fingers 163, each of which controls a circuit through one of the solenoids 57. The number of the contact fingers 163 is equal to the number of solenoids, which in turn is equal to the number of roll sections to be controlled. Manually operated switches 164 are interposed in each solenoid circuit so that any one of the solenoids may be cut out by opening its switch 164. It will be observed that the timer switches A or B operate to cause pulsations of relays 155, 155$^a$ and 143$^a$, whereby the relays 143$^a$ are alternately energized and deenergized to close and open main operating circuits for the solenoids 57 from the main leads 143, 143′. Such a main operating circuit is represented, for example, by wires 168, 168′, the latter containing a relay switch 143$^a$ energized and deenergized by the closing and opening of circuits including the conductors 150, 152 and 151, 153 by the action of the switches A and B.

A typical circuit from the emergency control device C through the solenoids is represented by the last solenoid circuit at the right of the control device, leading from contact fingers 163 through wire 165, finger switch 164, wires 166, 167, relay 143$^a$ and wire 168′ connected to line 143, solenoid 57, thence through wire 168 back to the line 143′. The lines through the other contact fingers are the same except that the first nine lines at the left, or any desired number of lines, are provided with auxiliary control switches 145, 146, actuated automatically from the switches 79 and 81, which in turn are operated by the movement of glass through the leer, as previously described briefly in connection with the description of Figs. 3 and 4. These auxiliary control switches 145 and 146 are in addition to the controls in the remaining circuits. When these auxiliary controls are closed the circuits from the emergency control through the solenoids of the first nine lines at the left are identically the same as the circuits for the remaining sections, previously described. When the switches 145 and 146 are open no current is supplied to the solenoids of the first nine lines, and consequently the rolls of the sections controlled by these solenoids are rotating constantly forward. The switch 145 controls the first seven solenoids, and the switch 146 the eighth and ninth solenoids.

By the use of the emergency control device all the contact fingers 163 and, consequently, all the solenoids may be placed in circuit with master control A, this arrangement being that shown in Fig. 6. By turning the handle 160 of the emergency control slightly to the left so that the insulating blocks will be moved just beyond the main switches 161 and 162 all the solenoids may be placed in circuit with master control B. The master controls may be set for any desired operation of the rolls by regulating the relative lengths of the conducting and nonconducting portions of the dials as previously set forth. Instead of connecting all the lines to one master switch A or B a part of the lines may be connected to one switch, and part to the other master switch by setting one of the insulating blocks 158 or 159 of the emergency control device at a point intermediate the ends of the row of contact fingers 163. Thus by placing insulating block 158 at the finger contact indicated at D the solenoid in the particular line leading from this contact will be cut out of operation. The lines to the left of position D will then be in circuit with master control A, while those to the right will be in circuit with master control B. Assuming that control A is set to produce equal forward and reverse rotation of the rolls and control B is set to produce a general forward movement it will be seen that by the above described operation sheets of glass in rear of a section of broken glass could be prevented from advancing and thus destroying the good sheets, while the sheets of glass in advance of the defective section could be caused to move uninterruptedly out of the leer. Obviously, innumerable other modes of operation may be employed depending on emergencies which may arise under actual service conditions. Complete control of all sections of the leer may be had by the arrangement herein described.

It is desirable that in case of failure of any one of the solenoids to operate, this fact may at once be brought to the attention of the operator. For this purpose the signal lights 124 are provided which, as previously set forth, are controlled by switches operated by the plungers of the solenoids so that in case one solenoid is not functioning the corresponding light 124 will go out.

While the leer is capable of flexible operation and emergency control, as above described, the normal operation is that illustrated graphically in Fig. 7, in which the movement of the glass in feet is designated by the abscissa at the top of the sheet, and the time in seconds is illustrated by the vertical numerals or ordinates.

In the figure the line M N is intended to represent the movement of the front end of a sheet of glass passing through the leer, the portion M of the line indicating the initial forward movement on the primary and transfer rolls of the leer, while the portion N indicates the intermittent forward and rearward movement in passing through the major portion of the leer. The movement of the rear end of the sheet of glass is indicated by the second line O P, while the third line Q R illustrates a portion of the path of the front end of a second sheet of glass. It will be noted that the path of the rear end of the first sheet of glass and that of the front end of the second sheet merge at S, and that from there on the movement of the two sheets through the leer is synchronized. The successive sheets are started at determined intervals of time, as indicated by the graph, but by the time the sheets enter the main portion of the leer and take up the alternate forward and rearward movement they occupy practically the entire space in the leer, the front end of one sheet reaching practically to the rear end of the sheet in front of it. In this manner the leer is operated with the utmost efficiency. Moreover, the alternate forward and rearward movement of the glass gives the effect of a much longer leer than that actually employed, i. e., a travel range for the glass sheets between the entrance and exit ends of the leer, which is of a distance greater than the length of the leer, and much more efficient annealing than is possible with any other device, is obtained.

The normal operation of the leer will now be described in connection with the wiring diagram, Fig. 6.

As previously set forth the leer is composed of rolls arranged in a plurality of sections. All the roll sections except the first section, are controlled by individual solenoids, the operation of which has already been described.

Reference will now be made to the control of the leer as a whole, including all the sections of rolls from the second section to the end of the closed portion of the leer. As previously stated, the rolls beyond the closed section at the discharge end of the leer are first the idler rolls 21, and then the manually controlled power driven rolls 22, the operation of which has already been described, and which will not be included in the following discussion.

Referring to Fig. 6, the rolls of the first ten sections of the leer are indicated by roman numerals I to X, inclusive, as the operation of these sections is somewhat different from the remaining sections beginning with the eleventh section and extending to the end of the closed portion of the leer. These latter sections during normal operation of the leer rotate successively forward and rearward controlled by their respective solenoids 57, which in turn are controlled by the timer switch A.

At the entrance to the open portion of the leer is the switch arm 79, which as shown in Fig. 8 is pivoted intermediate its ends as at 135, whereby, when a sheet of glass enters section I the line 80 will be broken at 136. The second switch arm 81 is located near the entrance to the closed portion of the leer, and closes the circuit 80 at 137 only when the arm 81 is raised by contact with a sheet of glass, the line 80 being normally open at this point.

The first or primary section of rolls I rotates forwardly only and has no solenoid for controlling its operation, this set of rolls being constantly operated from the main drive shaft. Rolls II to VIII, inclusive, are provided with solenoids which are controlled by both the switches 79 and 81, and the rolls IX and X are controlled by the switch 81 alone. The rolls II to X inclusive may be termed the transfer rolls, as their function is to transfer a sheet of glass from the primary set of rolls I which rotates constantly forwardly to the secondary rolls, which comprise most of the leer and extend from the eleventh section on, and which are periodically reversing in direction of rotation. These transfer rolls are necessary to prevent buckling of the sheets, which would occur if a sheet were passed directly from the forwardly rotating rolls to the reversing rolls. The transfer rolls may be automatically synchronized with the primary or constantly rotating rolls, and then with the secondary or reversing rolls.

Before the first sheet of glass is delivered to the leer the switch 79 is closed while the switch 81 is open. Therefore, the rolls of the first ten sections are rotating forwardly only, while the rolls in the remaining portion of the leer are rotating successively forwardly and rearwardly. When the first sheet enters section I the switch 79 is opened, which, however, does not change the operation of the first ten sections of rolls, as the circuit is already opened by switch 81. The sheet continues to advance forwardly until its rear end passes from under switch 79, and subsequently the front end closes switch 81. Thus the line 80 is completely closed allowing current to pass from the main line lead 143 at 138 through wires 80, 139, 140, 141, 142, switch 145 and from conductor 144 through a conductor 144' to the main line lead 143'. A magnetic relay is provided in conductor 140 at 144 by means of which when switch 81 is closed switch 145 is operated as above described, thus closing a plurality of circuits which include the solenoids 57 of roll sections II to VIII inclusive, whereby the rolls of these seven sections are synchronized with the rest of the leer and rotate successively forwardly and rearwardly. Likewise the rolls of the ninth and tenth sections rotate in the same manner in synchronism with the rest of the leer, a circuit from main lead 143 having been closed by means of switch 81 through wire 170, timer 171, relay 172, and through conductor 172' to the main lead 143'. The energization of relay 172 closes switch 146, thus completing the circuit from the emergency control C, from one side of the supply line through wires 173 and 174, thence through relays 143ª to the solenoids of the ninth and tenth sections, and back to the other side of the supply line. The action of the timer switches A and B in alternately energizing the relays 143ª has been previously described.

At a proper interval after the first sheet a second sheet enters the leer as the first sheet is moving forwardly and rearwardly on the transfer rolls. As soon as the front end of the second sheet reaches switch 79 sections II to VIII inclusive are caused to rotate forwardly only. This movement continues until the rear end of the second sheet has passed from under switch 79, whereupon the circuit is closed.

This would cause the rolls in sections II to VIII to commence the reversing movement, except for the fact that the interval between the pouring of the first and second sheets is such that by this time the rear end of the first sheet has passed from under switch 81, thus breaking the circuit at this point and causing the rolls in sections II to VIII to rotate forwardly only. Sections IX and X also take up this forward movement after a delayed interval, which allows the first sheet to pass entirely from these two sections, the delayed action being due to the timer 171, which controls the solenoids of sections IX and X, this timer being connected to the negative line 143' by means of wires 180, 181 and 182, as shown, and through relay 172, wires 173 and 174 and associated relays 143ª to the solenoids of said sections and to the positive line 143. When the front end of the second sheet reaches the switch 81 sections II to X, inclusive, take up the reversing movement in synchronism with the rest of the leer. This synchronism of the transfer rolls with the constantly forwardly moving rolls of the first section and then with the reversing rolls in the remainder of the leer continues as each additional sheet of glass is fed up unless the operation is varied by the action of the emergency control device, as hereinbefore described.

From the foregoing description, it will be seen that in the operation of the apparatus the glass sheet passes first onto a series of rolls rotating in a forward direction only at a determined peripheral speed, which is at least as great as that of the speed of sheet formation when the leer is operatively coupled to a sheet glass casting device, while the rollers in the principal portion of the leer are revolving successively forwardly and then rearwardly, but at the same peripheral speed as the rolls which move forwardly only. These alternately reversing rolls normally rotate in a forward direction for a longer period than in the rearward direction, in order that there may be a general advance of the sheet through the leer as a whole. By the use of the transfer rolls which transfer the sheet of glass from the forwardly moving rolls to the reversing rolls any danger of breaking or buckling of the sheet of glass is prevented. As stated, these alternately reversing rolls normally rotate in a forward direction for a longer period than in the rearward direction, thus establishing a differential action in order that there may be, with a decreased rate of progress, a general advance of the sheet through the leer as a whole. The purpose of periodically reversing the direction of movement of the rolls within the leer while maintaining a predetermined peripheral speed of rotation of all the rolls is to obtain a maximum annealing effect for a given length of leer or the travel of the glass through an annealing course of greater length than the length of the leer as a whole, without necessarily slowing up the speed of rotation of the rolls at the time they are acting on a sheet and thereby permitting the glass to sag between the rolls and causing deformation of the rolls themselves due to slow rotation.

It is, of course, not necessary that in the use of the apparatus for annealing sheet glass to have the glass formed by a forming apparatus coupled to the roller leer as the glass sheets may be formed by a separate mechanism and intermittently fed through suitable intervening means to the rolls 17 of section 18 of the leer for travel through the leer to obtain the annealing action described. The principle of the invention may also be applied to the annealing of glassware, porcelainware, or ceramicware suitably formed and placed upon the roller leer for transport, as by arranging the articles in trays or other receptacles placed intermittently at the predetermined intervals upon the rollers 17 of the leer section 18 for transmission through the leer. The apparatus may also be used for the transportation of bars, billets or other elements or articles which are to be fed through a treatment course for tempering or other purposes, as well as for drying purposes in the drying of various materials or for coating of materials and other similar treatments, where the material is to be transported while subjected to treatment for a length and time duration of travel greater than that required for its normal direct travel from end to end of the leer or treatment course, so that materials may be transported and subjected to prolonged treatment without the use of a leer, kiln or treatment course of prohibitive length. It is to be understood that the operations of the sets of rolls in the direction of feed of the material may be reversed, that is to say, that the first set of rolls or any number of sets of rolls in the preliminary traverse of the material may be reversing rolls, to give a slow rate of progress, while the rolls conveying the material on its final stage of traverse may move continually in one direction to give the material a high speed rate of progress. In all cases, however, the timing of the action of the rolls may be so governed that at the time the rolls are working on a sheet the rolls will operate at the same peripheral speed, whether moving forwardly or rearwardly, so that a fast rate of progress as a whole of the material may be obtained without injury to frangible or delicate materials or to delicate surfaces thereof liable to be damaged by irregular actions. Within the scope of the invention, also, conveyer units of other than roller type may possibly in some cases be used, particularly in the handling of certain materials and by the employment of conveyer units of restricted length.

Having thus fully described my invention, I claim:

1. In an electric control system for conveyers, a roller conveyer, driving means for the rolls of the conveyer, and automatic electrically controlled means governing the driving means for causing the same to periodically and differentially rotate the rolls alternately forward and backward.

2. In an electric control system for conveyers, primary and secondary sets of conveyer rolls, driving means for normally rotating both sets of rolls, means for reversing the secondary set of rolls, and automatic electrically controlled means governing the driving and reversing means, for periodically causing said driving and reversing means to cause the secondary rolls to differentially revolve forwardly and rearwardly.

3. In an electric control system for conveyers, a primary set of conveyer rolls, a secondary set of conveyer rolls, a set of transfer rolls between the primary and secondary sets of conveyer rolls, driving means for all the rolls, and electrical means governing the driving means to cause the primary set of rolls to constantly rotate in a forward direction, the secondary and transfer rolls to periodically revolve in a forward direction and then in a backward direction, and the transfer rolls to synchronize successively with the primary rolls and the secondary rolls.

4. In an electric control system for conveyers, a conveyer comprising sets of rolls, roll driving and reversing means, and automatic electrically controlled governing means controlling said driving and reversing means and acting thereon to cause the rolls of one set to constantly rotate in one direction and to periodically cause the rolls of the other set or sets to rotate first in one direction and then to rotate in the opposite direction, respectively, for different time periods.

5. In an electric control system for conveyers, a conveyer comprising a plurality of rolls, driving and reversing means for the rolls, and automatic electrically controlled means governing the driving and reversing means and acting thereon to cause the same to drive all the rolls at a common speed and to rotate a group of the rolls constantly in one direction and to periodically and for different time periods rotate a following group of the rolls first in one direction and then in the reverse direction for different time periods.

6. In an electric control system for conveyers, a conveyer comprising a primary set of rolls, a secondary set of rolls, and transfer rolls between the primary and secondary rolls, driving and reversing means for the rolls, and electrically controlled governing means controlling said driving and reversing means to cause the same to drive the primary set of rolls in a forward direction, to drive the secondary rolls alternately differentially forwardly and rearwardly, and to cause the transfer rolls to rotate first in the same direction as the primary set of rolls and then in the opposite direction with the secondary set of rolls.

7. In an electric control system for conveyers, a plurality of conveyer rolls, driving and reversing means for the rolls, and time controlled automatic electrical governing means controlling the driving and reversing means for producing an action of the rolls on an article being conveyed thereby such as to cause the article to be periodically shifted differentially backwardly and forwardly by the rolls along a definite portion of the conveyer so as to travel during a definite period of time a distance backwardly and a greater distance forwardly.

8. In an electrical control system for conveyers, a primary set of conveyer rolls constantly rotating in a forward direction, a secondary set of conveyer rolls arranged in groups, means for periodically causing some of the rolls to rotate in a forward direction and some to rotate in a rearward direction, the period of forward rotation of the rolls being greater than that of the rearward rotation of the rolls, a set of transfer rolls arranged between the primary and secondary rolls and rotating alternately for periods first with the first set of rolls and then with the adjacent group of the second set of rolls, driving means for rotating all the rolls, and electrical means for controlling the rolls to operate as set forth.

9. In an electric control system for conveyers, a roller conveyer, means for driving all the rolls of the conveyer, and electrically controlled automatic means governing the driving means for periodically effecting a reversal of rotation of rolls at a plurality of points along the conveyer in the path of travel of an article being transporteed by the conveyer for a time period to cause the article to periodically travel backwardly and forwardly a greater distance forwardly than backwardly.

10. In an electric control system for conveyers, a conveyer comprising a continuous series of independently movable units, driving means coupled to the units for driving them in sets and operative for driving the units of certain sets periodically forward and backward for a differential feed speed motion of said sets with respect to other sets, and time controlled automatic electrically operated means governing said driving means to effect such actions of the units.

11. In an electrical control system for roller conveyers including a set of reversing rolls, a set of constantly driven power shafts for rotating the reversing rolls, automatic electrically controlled means for periodically reversing the direction of rotation of said rolls, and means governing said electrically controlled means for causing all or a portion of said reversing rolls to rotate forwardly or intermittently forwardly and rearwardly.

12. In an electrical control system for roller conveyers, a conveyer comprising a plurality of rolls, a main shaft for driving all the rolls in a given direction at a given peripheral speed, countershafts geared to the main shaft and rotating in the opposite direction at a speed at least as great as the speed of the main shaft, and automatic electrically controlled means for periodically connecting a portion of said rolls successively to the main shaft and to the countershafts.

13. In an electrical control system for roller conveyers, a conveyer comprising a plurality of rolls, a main shaft for driving all the rolls in a given direction at a given peripheral speed, countershafts geared to the main shaft and rotating in the opposite direction thereto, gearing for connecting the main shaft to the rolls, gearing for connecting the rolls in groups to the main shaft through the countershafts, and automatic electrically controlled means for periodically and alternately throwing the first and second-named gearings into and out of operation.

14. In an electrical control system for conveyers, a conveyer comprising rolls including a set of reversing rolls, a constantly driven power shaft for rotating all the rolls at a given speed, reversing mechanism driven by the shaft, electrically controlled means for actuating said reversing mechanism for periodically reversing the direction of rotation of said reversing rolls, and means forming part of said electrically controlled means for selectively controlling all or a portion of said reversing rolls to cause them to rotate forwardly or intermittently forwardly and rearwardly.

15. In an electrical control system for conveyers, a conveyer comprising groups of rolls, means for rotating the rolls, reversing mechanism, electrical means including a control device for periodically setting the reversing mechanism into action to reverse the direction of rotation of certain groups of the rolls, and control means governing the first-named control means for ensuring synchronization of each group of forwardly and backwardly rotating rolls with respect to preceding or succeeding groups of rolls.

16. In an electrical control system for conveyers, a conveyer comprising rolls arranged to form a primary set of feed rolls, a secondary set of feed rolls and an intermediate set of transfer rolls, means for rotating the rolls, an electrically controlled means for causing the primary set of rolls to rotate constantly in a forward direction and the secondary set of rolls to be periodically reversed in direction of rotation, and control means automatically governing the transfer rolls to cause them to synchronize with the primary and secondary sets of rolls successively.

17. In an electrical control means for conveyers, a conveyer comprising rotatable rolls arranged in primary and secondary sets, a main shaft for furnishing power for all the rolls, countershafts geared to the main shaft for rotating certain of the rolls in the opposite direction to their direction of rotation by the main shaft, and automatic electrically controlled means for periodically connecting a portion of the rolls of at least the secondary set to the main shaft and to the countershafts.

18. In an electrical control means for conveyers, a conveyer comprising rolls, a main shaft for furnishing power for all the rolls, countershafts geared to the main shaft and rotating in the opposite direction thereto but at the same speed as the main shaft, automatic electrically controlled means for periodically connecting certain of said rolls successively to the main shaft and to the countershafts, and control means for differentially varying the period of connection between said certain rolls and the main shaft and countershafts, respectively, whereby the rate of travel of an object being conveyed by the rolls may be varied as a whole during the range of its conveyance by the conveyer.

19. In an electrical control system for conveyers, a conveyer comprising rolls arranged in sections, a main shaft for furnishing power for all the rolls, countershafts geared to the main shaft and rotating in the opposite direction thereto, clutches for connecting the rolls of a given section to the main shaft and the countershafts, and automatic electrically controlled means for periodically and successively actuating said clutches for connecting the rolls of the given section successively to the main shaft and to countershafts.

20. In an electrical control system for conveyers, a conveyer comprising rolls, electrical driving means for rotating the rolls, and electrical control means governing said driving means for automatically causing said driving means to periodically reverse the direction of rotation of some of the rolls for time periods with respect to periods of forward rotation of the rolls so as to secure a differential forward and backward rotation of said rolls.

21. In an electrical control system for conveyers, a conveyer comprising rolls, means for driving the rolls, and automatic electrical control means for the driving means operative on said driving means for periodically reversing the direction of rotation of some of the rolls with relation to other rolls and to the direction of travel of an article being transported by the rolls so as to cause the rolls to travel forwardly and then backwardly for a less duration of time than forwardly, whereby the rate of travel of the article is varied to retard its progress at one or more points in its travel.

22. In electrical control means for conveyers, a conveyer comprising a succession of conveyer units, driving means for normally driving all the units in a common direction, and automatic electrically controlled means governing the driving means for periodically and differentially reversing the direction of motion of some of the units while maintaining the normal direction of motion of the other units.

23. In electrical control means for conveyers, a conveyer comprising a succession of conveyer units including reversible units, driving means for the units, automatic electrically controlled governing means for the driving means operable in the travel of an article being transported by the conveyer to cause the driving means to give a differential back and forth motion to the reversible units of the conveyer, and means for varying the operation of said governing means to cause the same to impart a forward driving action to some of the reversible units and a back and forth motion to other reversible units.

24. In electrical control means for conveyers, a conveyer comprising a succession of conveyer units, driving means for simultaneously operating the units, and electrical control means for the driving means operative at a plurality of points in the travel of an article being transported by the conveyer to reverse the direction of motion of certain units with respect to other units and to the normal direction of feed motion of the units to cause such certain units to have successive backward and forward movements for such relative degrees or time periods as to periodically reverse the direction of travel of the article so as to move the article backward and forward a greater distance forward than backward to reduce the rate of progress of the article as compared with a continuous forward motion thereof.

25. In an electrical control means for conveyers, a conveyer having primary and secondary sets of rolls, driving means for rotating all the rolls in a forward direction at the same normal speed, driving means for driving the rolls of the secondary set rearwardly at the same normal speed, and automatic electrically controlled means for alternately coupling the first and second-named driving means to the secondary rolls for different time periods.

26. In an electrical control means for conveyers, primary and secondary sets of conveyer rolls, intermediate transfer rolls, means for driving all the rolls forwardly at the same speed, means for driving the secondary and transfer rolls rearwardly at the same speed, and automatic electrically controlled means for periodically coupling the secondary and transfer rolls to the first and second-named driving means and operative in the control action to synchronize the transfer rolls first with the primary rolls and then with the secondary rolls.

27. In an electrical control system for conveyers, conveyer rolls, driving means for driving the rolls either forwardly or backwardly, electrical devices controlling the driving means for governing the forward and backward rotation of the rolls, and means for controlling said electrical controlling devices to alternately and automatically effect the driving of the rolls forwardly and backwardly for different time periods.

28. In an electrical control system for conveyers, conveyer rolls, driving means for driving the rolls either forwardly or backwardly, and automatic electrically operated devices governing said driving means for effecting the forward and backward rotation of the rolls, said means controlling said devices to simultaneously drive some of the rolls forwardly and others backwardly.

29. In an electrical control system for conveyers, conveyer rolls, driving means for driving the rolls either forwardly or backwardly, electrically operated devices governing the driving means for effecting the forward and backward rotation of the rolls, and means controlling said devices to govern the driving means to cause the same to simultaneously rotate some of the rolls forwardly and others backwardly and to cause certain of the rolls to alternately rotate forwardly and backwardly for unequal periods of time.

30. In an electrical control system for conveyers, conveyer rolls, driving means for driving the rolls either forwardly or backwardly, electrically operated devices governing the driving means for effecting the forward and backward rotation of the rolls, and means automatically controlling said devices to govern the driving means to cause the same to rotate certain rolls constantly in a forward direction and to rotate other rolls alternately forwardly and backwardly for different time periods.

31. In an electrical control for conveyers, conveyer rolls, electrically operated driving means adapted to be coupled to the rolls to drive them in groups forwardly or rearwardly, an automatically acting control device for governing said driving means to cause the same to periodically rotate the rolls alternately forward and backward, and means for regulating said control device to vary the time periods of the forward and backward rotations.

32. In an electrical control for conveyers, a plurality of groups of conveyer rolls, electrically controlled driving means adapted to be coupled to the rolls to drive them in groups forwardly or rearwardly, controlling means including a time controlled control device for governing said driving means to rotate some of the groups of rolls alternately forward and backward and ware actuated devices governing said driving means to maintain the rolls of a certain group in connection with the driving means for forward rotation of said rolls and travel of the ware over said rolls to a succeeding group of rolls, and means for regulating said time controlled control device to vary the time periods of the forward and backward rotations.

33. In an electrical control for conveyers, a plurality of groups of conveyer rolls, electrically controlled driving means adapted to be coupled to the rolls to drive them in groups forwardly or rearwardly, controlling means including a time controlled control device for governing said driving means to periodically rotate the rolls forward and backward, a primary ware actuated device governing said driving means to maintain the rolls of a certain group in connection with the driving means for forward rotation of said rolls and travel of the ware over said rolls to a succeeding group of rolls and a second ware actuated device for continuing the forward driving action of final rolls of said certain group after the ware has passed beyond the preceding rolls of the group and is about to clear the said final rolls, and means for regulating said time controlled control device to vary the time periods of the forward and backward rotations.

34. In an electrical control for conveyers, conveyer rolls, driving means adapted to be coupled to the rolls to drive them in groups forwardly or rearwardly, and an automatic electrical control system governing the coupling of said driving means to the rolls to cause said driving means to rotate a group of rolls constantly forward and other groups of rolls alternately forward and backward.

35. In an electrical control for conveyers, conveyer rolls, driving means adapted to be coupled to the rolls to drive them in groups forwardly or rearwardly, and an automatic control system governing the coupling of the driving means to the rolls for forward or backward rotation, said control means including a pair of control devices for governing said driving means to cause the same to rotate the rolls alternately forward and backward, and controlling means governing the action of the control devices to adapt said devices to control the driving means independently or conjointly.

36. In an electrical control for conveyers, conveyer rolls, electrically controlled driving means adapted to be coupled to the rolls to drive them in groups forwardly or rearwardly, a pair of control devices for governing said driving means to rotate the rolls alternately forward and backward, means for regulating each control device for effecting forward or backward roll drive actions for varying time periods, and controlling means for governing the action of said control devices to adapt said devices to independently or jointly control the driving means.

37. In an electrical control means for conveyers, primary and secondary sets for conveyer rolls, the rolls of the secondary set of conveyer rolls being arranged in groups, driving means for driving all the rolls in a forward direction, driving means for independently driving the groups of rolls of the secondary rolls in a rearward direction, and automatic electrically controlled means for periodically and alternately connecting the groups of the secondary rolls to the driving means for forward and rearward driving actions, respectively, for differently timed periods.

38. In an electrical control means for conveyers, primary and secondary sets of conveyer rolls, the rolls of the secondary set of conveyer rolls being arranged in groups, driving means for driving all the rolls in a forward direction, transfer rolls between the primary and secondary rolls, and electrical control means for periodically and alternately effecting the backward and forward driving of the transfer rolls and groups of secondary rolls and synchronizing the transfer rolls successively with the primary and secondary rolls.

39. In an electrical control means for conveyers, primary and secondary sets of conveyer rolls, the rolls of the secondary set of conveyer rolls being arranged in groups, driving means for driving all the rolls in a forward direction, driving means for independently driving the groups of rolls of the secondary rolls in a rearward direction, automatic electrically controlled means governing the driving means to cause the same to normally drive the primary rolls constantly forwardly and the secondary rolls alternately backwardly and forwardly for different time periods, and means for influencing the control means to effect a periodic backward and forward rotation of one or more groups of rolls of the secondary set and a continuous forward rotation of one or more other groups of rolls of the same set.

In testimony whereof I affix my signature.

JULIUS SYLVESTER.